Figure 1:
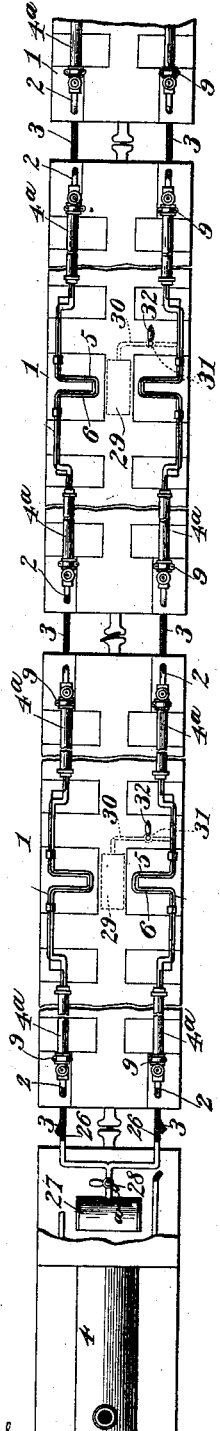

(No Model.)  5 Sheets—Sheet 1.

R. M. DIXON.
CAR HEATING APPARATUS.

No. 605,563.  Patented June 14, 1898.

Witnesses:
J. M. Withrow
Louis G. Julihn

Inventor,
R. M. Dixon,
By Joseph L. Atkins
Attorney (No Model.) 5 Sheets—Sheet 2.
R. M. DIXON.
CAR HEATING APPARATUS.
No. 605,563. Patented June 14, 1898.
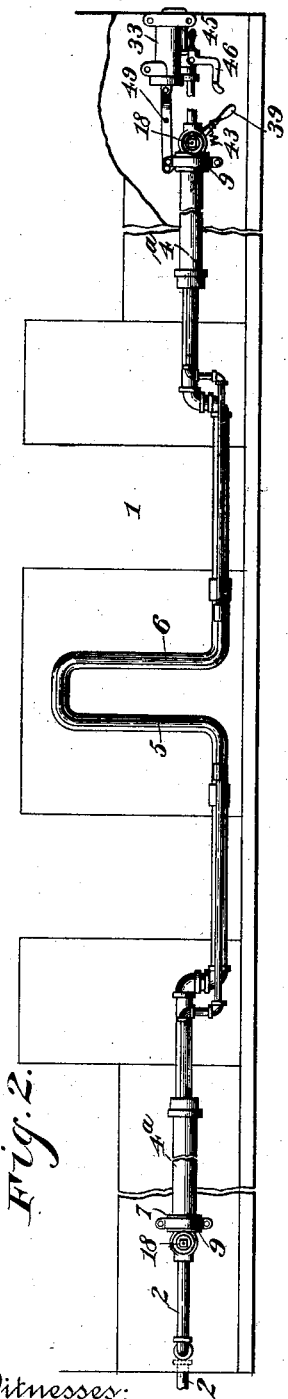
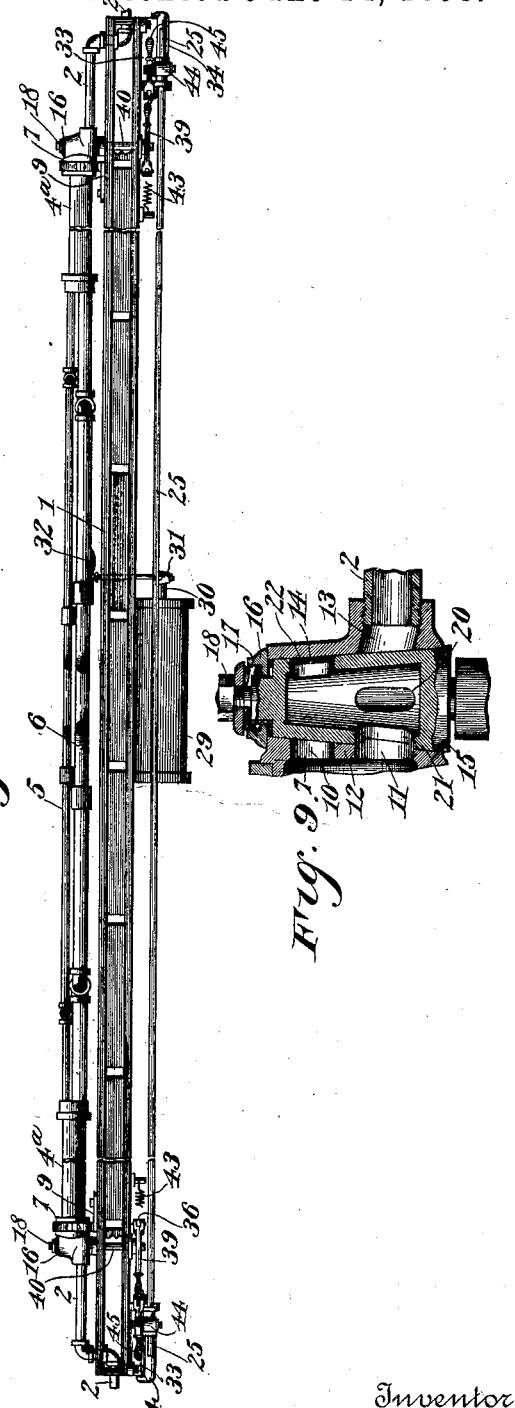

(No Model.)  5 Sheets—Sheet 3.
R. M. DIXON.
CAR HEATING APPARATUS.
No. 605,563.  Patented June 14, 1898.
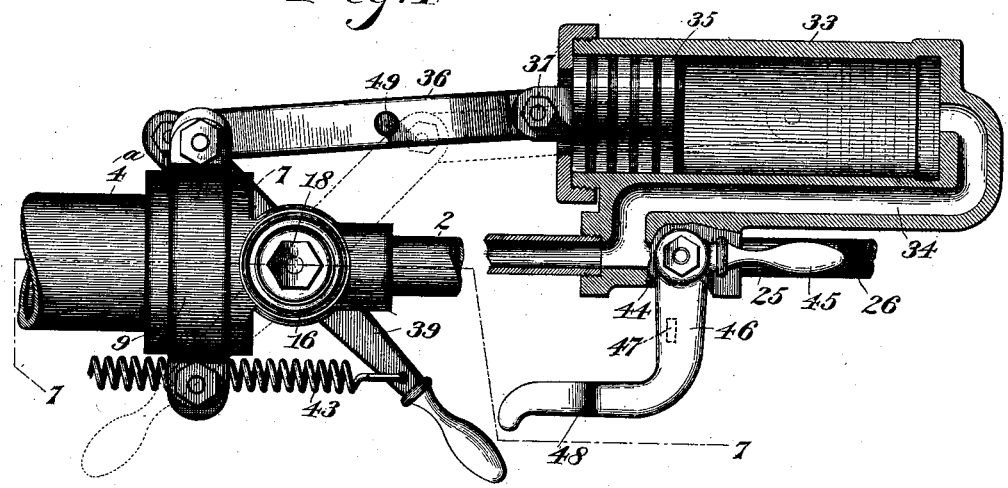
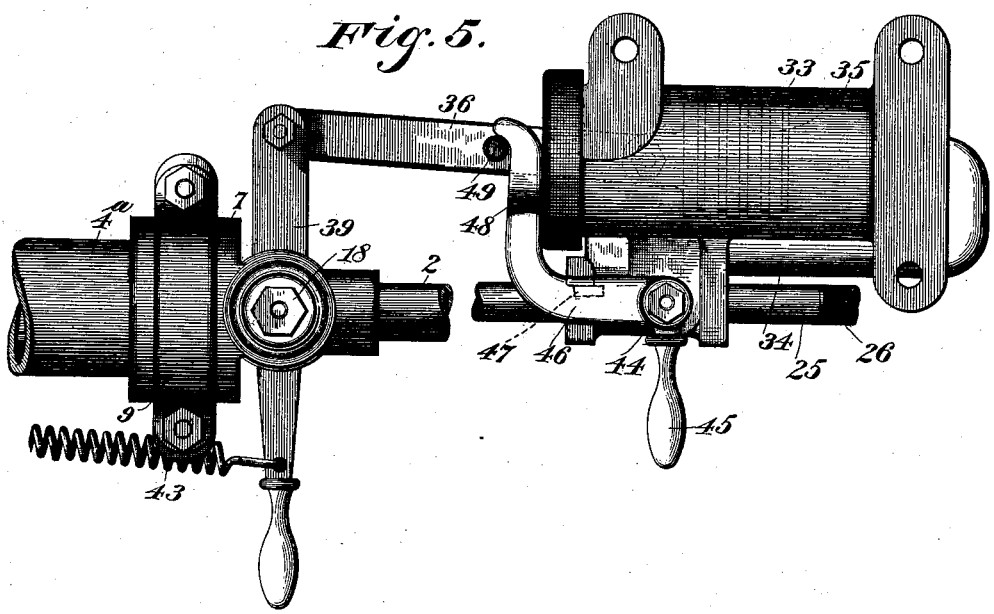

(No Model.)

R. M. DIXON.
CAR HEATING APPARATUS.

No. 605,563. Patented June 14, 1898.

Witnesses:
J. M. Witherow
Louis G. Julihn

Inventor,
R. M. Dixon,
By Joseph L. Atkins
Attorney

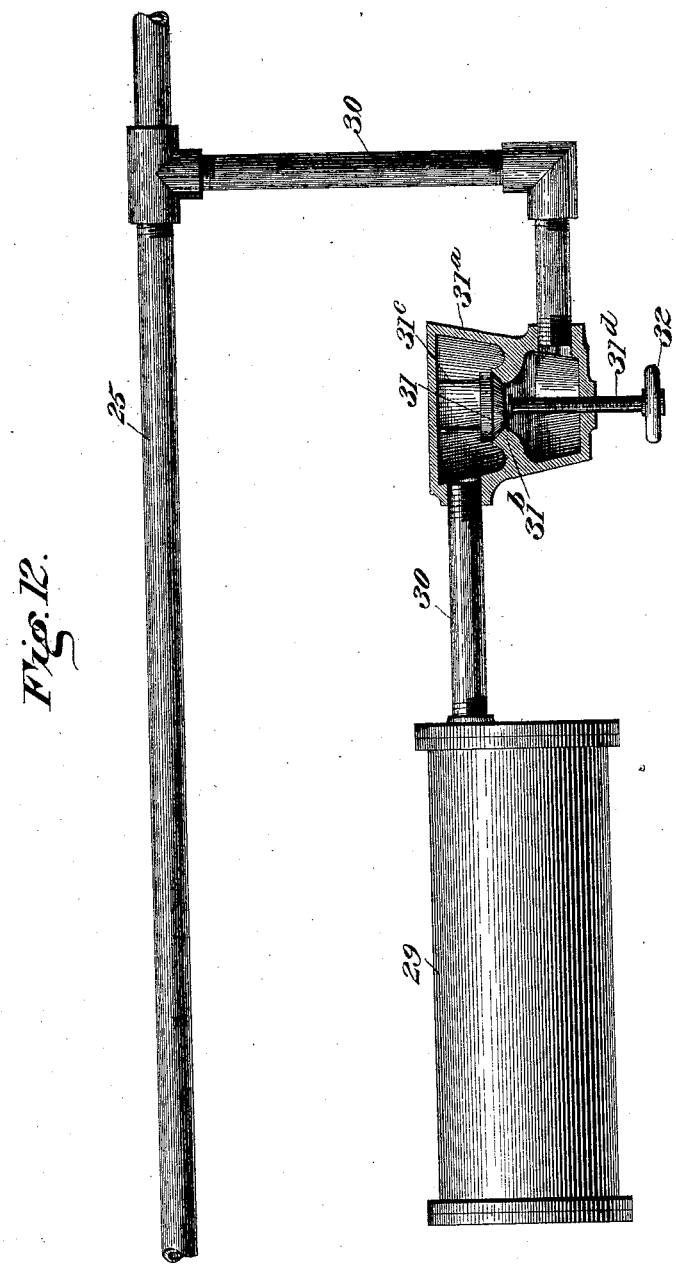

United States Patent Office.

ROBERT M. DIXON, OF EAST ORANGE, NEW JERSEY, ASSIGNOR TO THE SAFETY CAR HEATING AND LIGHTING COMPANY, OF NEW JERSEY.

CAR-HEATING APPARATUS.

SPECIFICATION forming part of Letters Patent No. 605,563, dated June 14, 1898.

Application filed March 17, 1894. Serial No. 504,050. (No model.)

*To all whom it may concern:*

Be it known that I, ROBERT M. DIXON, of East Orange, county of Essex, State of New Jersey, have invented certain new and useful Improvements in Car-Heating Apparatus, of which the following is a specification, reference being had to the accompanying drawings.

The object of my invention is to produce in steam heating apparatus for cars improved mechanism for disposing of the water of condensation.

My invention belongs to that class of steam-heating systems in which the water of condensation is permitted to collect in drainage-tanks provided for it in the system and from which tanks the accumulation of water is discharged from time to time as convenient opportunity is afforded. It has been customary to provide such tanks with valves and to discharge them by opening the valve by hand. While it is almost essential under some conditions that the water of condensation shall be carried by the car or train in which it accumulates and not allowed to escape gradually—as, for example, in elevated railroads—yet it is inconvenient and expensive to give separate attention to each tank from time to time as the water gathers in them. Moreover, the danger of overlooking one or more tanks is always present, from which interruption of the proper working of the steam-heating system may result. By my invention the necessity for attention to each individual tank is dispensed with and all the tanks are united into a drainage system and placed under the control of one operator, preferably the engineer, who may discharge all of them with facility by the simple turning of a lever. I accomplish this result by providing each drainage-tank with a drain-valve susceptible of pneumatic actuation and by coupling all such valves together by a single air-pipe extending, preferably, the length of the train. This air-pipe may operate the valves either through compressed or rarefied air. The source of compressed or rarefied air may be and is preferably located upon the locomotive; but it is not essential to the objects of my invention that it should be so located, and it may be located elsewhere in the train of cars. In fact, while I propose to provide means for operating the valves manually, it may be desirable on cars disconnected from the train to provide in them local means for pneumatically actuating the valves. Therefore each car may be provided with an auxiliary air-tank, so that the valves of a single car may be actuated from that car or the valves of any number of cars joined in a train may be actuated pneumatically from any one of the cars of the train.

There may be instances in which it would be convenient to cause each drain-valve to discharge independently of the other cars, and under my invention mechanism for that purpose is contemplated; but I believe it to be preferable to have all of the drainage-tanks united in a system and adapted to discharge the accumulated water of condensation in each from a single discharge-port, which would be in practice located at the end of the train.

Figure 11:
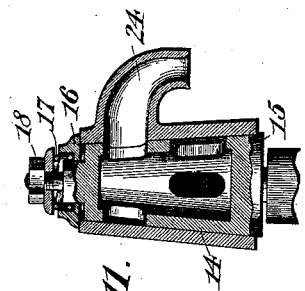
Figure 10:
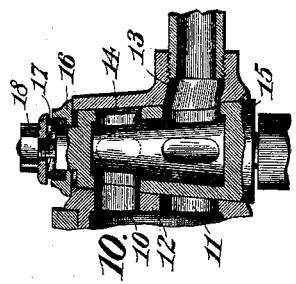
Figure 6:
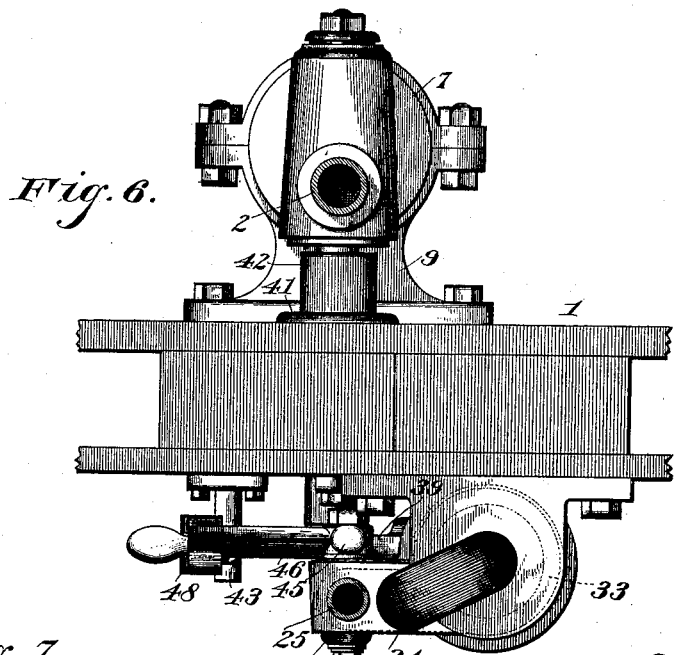
Figure 8:
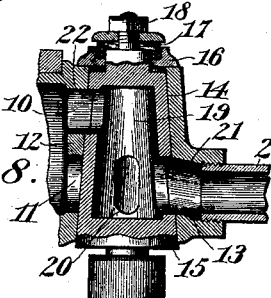
Figure 7:
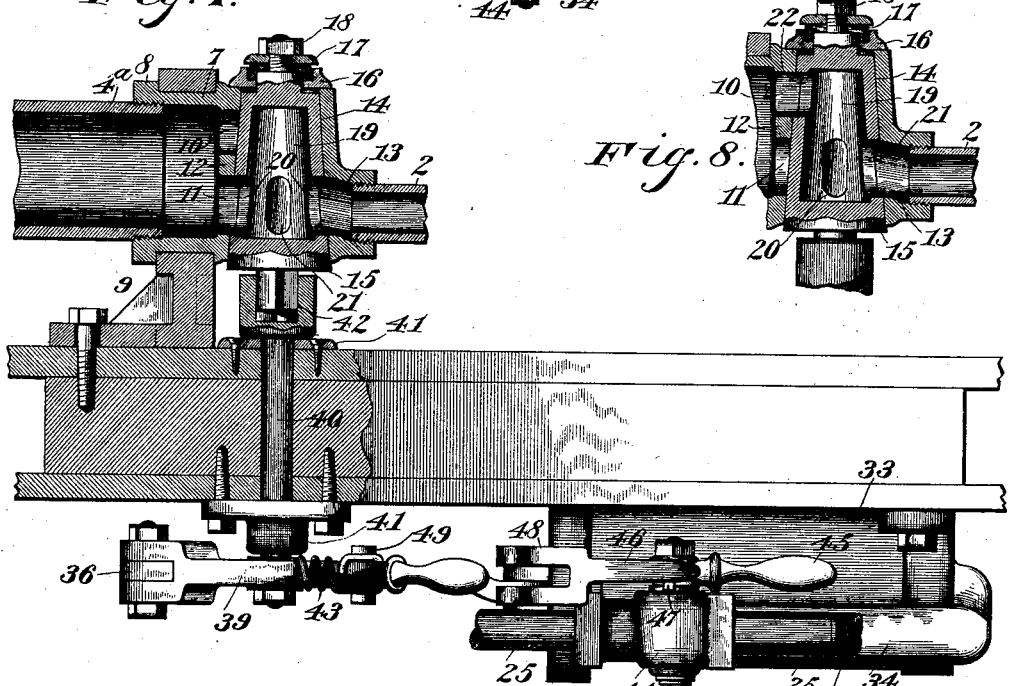

In the accompanying drawings, Figure 1 is a plan view of a train of cars, showing my apparatus applied thereto, the cars being shown merely in digrammatical outlines in order that all the parts of the apparatus may be unobscured. Fig. 2 is a similar view of a portion of a single car, showing the parts on a much-enlarged scale. Fig. 3 is a side elevation of the subject-matter of Fig. 2 with the car-floor in place. Fig. 4 is a plan view of my pneumatically-actuated valve and means for actuating the same, shown detached and on a larger scale, the valve-lever being shown in full lines in that position which it occupies with respect to the other parts shown when the valve-ports are open for their drainage operation, the position which the lever occupies when the ports of the valve are set for heating being shown in dotted lines. Fig. 5 is a view similar to that shown in Fig. 4 with the stop-arm thereof in position to limit the movement of the valve-lever, in which position all ports of the valve are closed. This position of the lever is required only at the rear end of the last car. Fig. 6 is an end view of the subject-matter shown in Figs. 4 and 5. Fig. 7 is a section on the line 7 7 of Fig. 4. Fig. 8 shows in detail the valve set for steam-heating when the valve is an intermediate one in the system. Fig. 9 shows the same when the valve is the last one of the system and located in the rear end of the rear car. Fig. 10 shows a modified form of valve adapted for draining each car individually instead of draining from a single terminal discharge-port. Fig. 11 is a section taken at right angles to the view shown in Fig. 10. In the modified forms shown in this and the preceding figure the valves or ports are modified to accommodate them to the office of local drainage. Fig. 12 is a view of a portion of my apparatus, illustrating in detail one of the auxiliary air-tanks and in section the automatic valve for supplying it with pneumatic energy and means for utilizing the stored-up pneumatic energy when required.

In the accompanying drawings, 1, wherever it occurs, indicates a car-floor.

2 indicates the steam train-pipe, and 3 the usual coupling by which it is flexibly joined between the cars. The train-pipe communicates with a source of steam-supply 4, preferably the boiler of the locomotive. Its office is to conduct steam from said source into the heating system of each car and through the same to all the cars of the train. The separate heaters of those heating systems which belong individually to each car may be of any suitable construction and arrangement; but I have illustrated as a preferable variety of heater in this connection a class in which drainage-tanks 4ª, united by an upper steam-pipe 5 and by a lower condensation-pipe 6, are employed. The drainage-tanks preferably consist of pipes of comparatively large diameter, that are adapted to hold a considerable quantity of water of condensation without being obstructed above the level of the water of condensation. It is designed in such systems that the diameter of the condensation-pipe 6 shall approximate the height to which the water of condensation may rise in the drainage-tanks, and the condensation-pipe acts to increase the drainage capacity of the tanks and to afford free circulation of the water of condensation from one tank to another in each car. It is essential to the operation of such systems that a passage of steam should remain at all times open through the heating system and the drainage-tanks, and for that reason the upper or steam pipe 5 is provided as a means of communication between the drainage-tanks.

It is necessary for the circulation of steam that the water of condensation in the drainage-tanks and drainage-pipes should be drawn off as soon as its surface approaches the lower level of the steam-pipe 5. For that purpose I prefer to employ a valve of peculiar construction, designed ordinarily to confine the water of condensation within the drainage-tanks without interrupting the flow of steam through the train-pipe 2 and steam-pipes 5, but which is adapted to open the drain-tanks for drainage thereof or to close all ports, as is required when the valve is located at the end of a train.

In Figs. 7, 8, and 9 the interior arrangements of a preferred form of valve are shown.

Refering to the construction of the valve, 7 indicates the barrel thereof, and 8 the mouth, adapted to receive and hold, as by screw-threads, one end of the pipe which constitutes a drainage-tank.

9 indicates a chair designed to be secured to a car-floor and support the valve-barrel at a height accommodated to that of the drainage-tank.

10 indicates the steam or upper supply port, and 11 the drainage or lower supply-port.

12 indicates a septum which separates the steam and the drainage ports and which is located at about the level which the water of condensation in the drainage-tanks may be permitted to attain.

13 indicates the discharge-port, which communicates with the train-pipe 2.

The bore of the barrel is tapered, as indicated at 14, to receive a close-fitting tapered valve 15, that is preferably held in place by a cap 16, a spring-washer 17, and nut 18, that combine in the ordinary manner to hold the valve revolubly within its barrel. The valve is provided with an interior chamber 19 of an altitude corresponding to the diameter of the drainage-tank. It is provided with oppositely-opening lower ports 20, as shown in Fig. 7 of the drawings, and at right angles thereto a single lower port 21. (Illustrated in Figs. 7 and 8.) It is also provided with an upper or steam port 22. (Shown clearly in Fig. 8 of the drawings.) If the heating system of a car is under steam and in use, the valve-ports will be in the position shown in Fig. 8 of the drawings. When it becomes necessary to discharge the water of condensation from the system, the valve is turned until the ports stand as illustrated in Fig. 7 of the drawings, in which position the steam-pressure in the drainage-tanks, acting directly upon the water of condensation, forces it through the lower part of the valves and the ports 20 into the pipe 2, and thence, if that be a terminal pipe, into the open air or into a waste-pipe, (not illustrated,) for example. Thereupon by closing the valves of the system the system is restored to its former condition and ready to operate as before. If the valve 15 be a terminal one in the system, it should be, except for the drainage operation, entirely closed. This may be readily accomplished by turning it to the position shown in Fig. 9 of the drawings.

The construction of the valve just described is designed to operate in a system which discharges its water of condensation through a single terminal discharge-port, which in practice, as will appear from the foregoing, consists of a continuation of that pipe which ordinarily acts as a train-pipe for conducting steam to the several heating systems of the cars of the train.

If it should be deemed desirable to drain each car individually, the object may be readily accomplished by constructing the valve with ports, as illustrated in Figs. 10 and 11 of the drawings, and providing the barrel of the valve with a discharge-pipe 24, as shown in the latter figure.

It will be perceived from the foregoing description that the valves 15 of each car are susceptible of manual operation; but it may be readily apprehended that such a means of operation would be inconvenient, expensive, and uncertain. I therefore have devised means for simultaneously actuating all of the drainage-valves of the several heating systems at one time from a single remote station on the train. I prefer to employ for this purpose pneumatically-operated mechanism designed to be actuated by rarefied or condensed air.

Referring therefore more particularly to the preferred mechanism of my invention, 25 indicates an air-pipe which extends, preferably, the length of the train, being flexibly coupled, as usual, by couplings 26, for example.

27 indicates a source of pneumatic energy preferably carried on the locomotive. It may consist of a cylinder or reservoir adapted to contain compressed air or to resist atmospheric pressure from without upon the rarefication of its internal atmosphere, it being obvious by a bare suggestion that the pneumatic energy may be developed either by compression or by suction.

28 indicates a valve located, preferably, upon the locomotive within reach of the engineer, for example, and designed to communicate through the pipe 25 pneumatic energy. The valve 28 is also provided with an exhaust-port $a$, through which, upon the valve 28 being turned, the air in the pipe 25 may escape, if compressed air is employed, or through which it may enter from the outside, if a vacuum is used.

As suggested, it may be desirable to employ auxiliary air-tanks on each car. Therefore I have illustrated at 29 such tanks communicating with the air-pipe, as by pipes 30, and provided with yielding valves 31, which may be operated by a handle 32 on the car. It is apparent that these auxiliary tanks may be stored or exhausted through the air-pipe, the yielding valve being adapted to move automatically one way or the other under pneumatic actuation from the air-pipe, and that by operating the handle 32 on any one of the cars the auxiliary tank is ready at any time to exert its stored energy upon the valve-actuating mechanism of the entire train.

In Fig. 12 of the drawings I have illustrated a simple form of yielding or automatic valve 31. It consists, substantially, of a valve, like an ordinary check-valve, contained within a casing $31^a$, and a valve-seat portion $31^b$, upon which the check-valve is seated. One section of the pipe 30, communicating with the air-pipe 25, enters below the valve-seat portion, and the other section, communicating with the auxiliary tank 29, opens above the valve-seat. The valve 31 may be inclosed within a guide-cage $31^c$. The handle 32 operates a screw $31^d$, that screws into the casing $31^a$ underneath the check-valve and is adapted to lift it against pressure from above derived from the auxiliary air-tank 29. It will be readily seen from this fact that if air under pressure is contained within the pipe 25 it will automatically raise the yielding valve 31 and store the auxiliary tank 29. When the pressure in the pipe 25 is released, the valve 31 will close, thereby storing the energy in the tank 29. By turning the handle 32 on the car the check 31 can at any time be lifted and the pneumatic energy in the tank 29 utilized as required.

The actuating mechanism which I have illustrated and prefer to employ for operating the valves pneumatically consists, preferably, of a cylinder 33, communicating through a pipe 34 with the air-pipe 25. Within this cylinder I provide a piston 35, adapted to be driven by the pneumatic energy transmitted through the air-pipe. I pivotally connect this piston, preferably through a pitman 36, pivoted, as at 37, to the piston, to a lever-handle 39, that is operatively connected to a valve-stem 40, secured to suitable bearings 41 in the floor of the car. The valve-stem is preferably in two parts, united by a joint, (indicated at 42;) but of course this is a matter of detail. I describe the part which connects the pitman to the valve-stem as a lever-handle, because it is desirable to provide means for manually operating the valve. The valve should normally occupy the steam-heat-transmitting position shown in Fig. 8 of the drawings and should be temporarily shifted from that position for drainage from time to time, as required. For that reason I prefer to employ yielding retaining mechanism for holding the valve in the position shown, for example, in Fig. 8. In its simplest form it may consist of a tensile spring 43, fastened at one end to the lever 39 and at the other end to the car-floor or a projection extending therefrom.

The terminal valve of the train should be subject to but two changes of position. Therefore in order to provide means for conveniently rendering any valve of a car available as a terminal valve I prefer to employ at each end of each car a two-way cock 44, of any suitable construction, located in and designed to close the air-pipe 25 or to open it, as may be required. To the stem of this cock I secure a handle 45 and at right angles thereto a bent lever 46. When the handle is turned lengthwise of the pipe 25, it acts as an indicator that the air-pipe is open, and when turned at right angles thereto, as indicated in Fig. 5, it not only indicates that the air-pipe is closed, but it throws the bent lever 46 into position to act as a limiting device, a lug 47 on its lower side being preferably employed to limit its own movement when thrown into the last-named position. A preferably-curved end 48 extends in the path of the pitman 36, upon which is provided a stop-pin 49, which strikes against the bent lever and prevents the movement of the lever-handle 39, to which the pitman is connected, beyond the right-angle position shown in Fig. 5. The position of the valves when the lever is in that position is clearly shown in Fig. 9 of the drawings. It will therefore be perceived that the air-cock and stop mechanism connected thereto are available both to close the air-pipe and the steam drain-pipe by one operation. It may be also noted that when the bent lever 46 is thrown into the limiting position the valve 15 is still free to move in the discharging position; but when retracted by the spring 43 it will return only to the position in which all the ports are closed. In this manner all the requirements of the valve in all the positions for which it is intended are fulfilled.

What I claim is—

1. The combination with a train-heating system, of drainage-tanks upon the cars thereof, means of communication between each of said drainage-tanks, and a single discharge-port for all of the tanks, of valves interposed between the drainage-tanks and their means of communication, adapted to shut off or establish drainage communication between the same, and mechanism for simultaneously operating each of said valves, substantially as set forth.

2. The combination with a train-heating system, of communicating drainage-tanks upon the cars of the system, and drainage-valves adapted to control the communication between the drainage-tanks, of a source of pneumatic energy, mechanism for pneumatically actuating the valves, and means of communication between the source of pneumatic energy and the pneumatic actuating mechanism, all substantially as set forth.

In testimony of all which I have hereunto subscribed my name.

ROBERT M. DIXON.

Witnesses:
D. W. PYE,
WM. R. THOMAS.